United States Patent [19]

Flamand et al.

[11] Patent Number: 4,583,820
[45] Date of Patent: Apr. 22, 1986

[54] WAVELENGTH MULTIPLEXER/DEMULTIPLEXER USING OPTICAL FIBERS

[75] Inventors: Jean Flamand, Chatenay Malabry; Philippe Gacoin, Gif s/Yvette; Jean-Pierre Laude, St Cyr la Riviere, all of France

[73] Assignee: Instruments S.A., Paris, France

[21] Appl. No.: 452,481

[22] Filed: Dec. 23, 1982

Related U.S. Application Data

[63] Continuation-in-part of Ser. No. 247,440, Mar. 25, 1981, abandoned.

[30] Foreign Application Priority Data

Dec. 24, 1981 [FR] France ................................. 81 24211

[51] Int. Cl.⁴ ............................................. G02B 6/34
[52] U.S. Cl. ............................. 350/96.19; 350/96.15; 350/96.16; 370/1; 370/3
[58] Field of Search ............... 350/96.15, 96.16, 96.17, 350/96.19; 370/1, 2, 3, 4; 356/333, 334, 331, 332

[56] References Cited

U.S. PATENT DOCUMENTS

| | | | |
|---|---|---|---|
| 4,111,524 | 9/1978 | Tomlinson | 350/96.19 |
| 4,153,330 | 5/1979 | Tomlinson | 350/96.19 |
| 4,198,117 | 4/1980 | Kobayashi | 350/96.19 |
| 4,208,094 | 6/1980 | Tomlinson et al. | 350/96.19 |
| 4,274,706 | 6/1981 | Tangonan | 350/96.19 |
| 4,329,017 | 5/1982 | Kapany et al. | 350/96.19 |
| 4,387,955 | 6/1983 | Ludman et al. | 350/96.19 |
| 4,479,697 | 10/1984 | Kapany et al. | 350/96.20 |
| 4,486,071 | 12/1984 | Levinson | 350/96.20 |

FOREIGN PATENT DOCUMENTS

| | | | |
|---|---|---|---|
| 55-35330 | 3/1980 | Japan | 350/96.19 |
| 55-74427 | 6/1980 | Japan | 356/334 |
| 55-10511 | 12/1980 | Japan | 350/96.19 |

OTHER PUBLICATIONS

Yen et al., "Plane Rowland ... Demultiplexing", Optics Letters, vol. 6, No. 12, 12/81, pp. 639–641.
Soares, "Self-Imaging ... Communications", SPIE, vol. 213, Optics and Photonics 1979, pp. 40–43.
Tanaka et al., "Simple Structure ... Demultiplexer", Electronics Letters, vol. 16, No. 23, 11/80, pp. 869–870.

*Primary Examiner*—William L. Sikes
*Assistant Examiner*—Brian M. Healy
*Attorney, Agent, or Firm*—Handal & Morofsky

[57] ABSTRACT

Selector for separating at least two wavelength bands from a complex light introduced into the apparatus through the end of an optical fiber (12) arranged in the immediate vicinity of the focal point of a concave mirror (5) producing a parallel beam directed towards a plane reflecting device, the return beam being focused towards an output optical fiber. It comprises at least one plane multidielectric layer (8) interposed between the concave mirror (5) and the plane reflecting device (10) and forming, with the vertex axis (6) of the concave mirror, an angle which is slightly different from that of the plane reflecting device, each multidielectric layer having a discontinuity in the vicinity of the vertex axis of the concave mirror.

11 Claims, 4 Drawing Figures

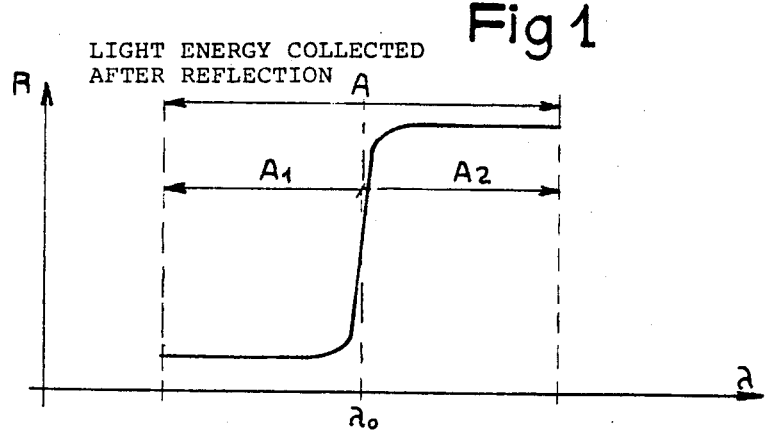
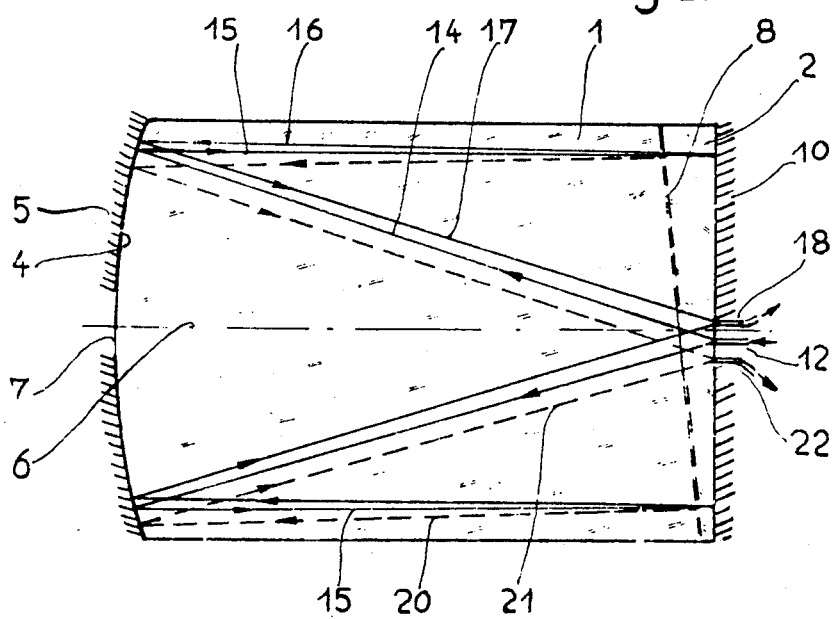

WAVELENGTH MULTIPLEXER/DEMULTIPLEXER USING OPTICAL FIBERS

CROSS-REFERENCE TO RELATED APPLICATION

This application is a continuation-in-part of co-pending U.S. patent application Ser. No. 247,440 entitled *Monochromator* filed March 25, 1981, of J. P. Laude, now abandoned, the disclosure of which is incorporated herein by reference.

FIELD OF THE INVENTION

The present invention relates to a selector for separating two wavelength bands from a complex light. It applies more particularly to the multiplexing or separation of data transmitted by optical fibers.

PRIOR ART

The development of the technique of data transmission by the modulation of light signals transmitted over long distances by optical fibers has led to the transmission, by one and the same fiber, of several signals each carried by lights of different wavelengths or different wavelength bands. It is therefore important to separate the various bands at the end of the fiber in order separately to detect each of the signals associated with each band.

Furthermore, the properties are known of multi-dielectric layers consisting of superimposed thin layers having a thickness of the order of a quarter of the wavelength of the light in question, and made alternatively of materials having a high and low index, such as, for example, zinc sulfide or cryolite. By suitably choosing the number and thickness of the elementary layers, an overall layer is obtained which, relative to a critical wavelength, reflects the wavelengths higher than this critical value $\lambda_o$, for example, and allows the lower wavelengths to pass through. This is illustrated by the simplified graph of FIG. 1, which shows, on the ordinate, for each wavelength, the light energy collected after reflection, by a multi-dielectric layer, of a light beam emitting in a broad spectral band A. In the band $A_1$, in which the wavelengths are lower than the critical wavelength $\lambda_o$ of the layer, virtually no light is reflected, whereas in the band $A_2$, in which the wavelengths are higher than $\lambda_o$, the light is virtually entirely reflected. The dielectric layer thus behaves like a mirror towards the band $A_2$ and like a transparent sheet towards the band $A_1$.

SUMMARY OF THE INVENTION

The invention constitutes a new application of a multidielectric layer for separating two different wavelength bands from a light introduced into the selector through an input optical fiber, and collecting them separately on at least two other output optical fibers.

The invention relates to a selector for separating at least two wavelengths bands from a complex light introduced into the apparatus through the end of an optical fiber arranged in the immediate vicinity of the focal point of a concave mirror producing a parallel beam directed towards a plane reflecting device, the return beam being focused towards an output optical fiber.

According to the invention, the apparatus includes at least one plane multidielectric layer interposed between the concave mirror and the plane reflecting device and forming, with the vertex axis of the concave mirror, an angle which is slightly different from the plane reflecting device, each multidielectric layer having a discontinuity in the vicinity of the vertex axis of the concave mirror.

According to a particular embodiment of the invention, the plane reflecting device is a plane mirror.

According to another embodiment of the invention, the reflecting device is a plane reflecting diffraction grating.

BRIEF DESCRIPTION OF THE DRAWINGS

The invention will be understood more clearly with reference to the particular embodiments given as examples and shown in the attached drawings.

FIG. 1 is a reminder of the distribution of the light energy of a beam with a broad spectral band, after reflection from a multidielectric layer.

FIG. 2 shows a device intended for separating only two wavelengths.

DETAILED DESCRIPTION

Figure 4:
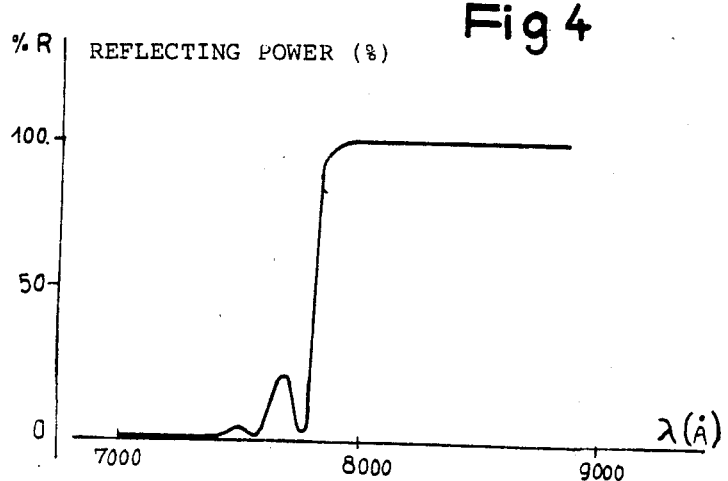

Referring firstly to FIG. 2, it is seen that the device consists of two juxtaposed glass blocks 1 and 2. The block 1 has a spherical or parabolic convex part 4. The surface 4 is made reflecting by a coating 5, which thus constitutes, towards the inside of the block, a concave mirror whose principle axis 6 is the normal to the vertex of the surface 4. The coating 5 is broken over a small central zone 7 in the vicinity of the vertex of the convex part. At the end opposite the surface 4, the block 1 has a plane surface to which a second block 2, having a conjugate plane surface, is stuck. The latter plane surface carries a multidielectric layer 8, which is also broken in the vicinity of the principle axis 6 of the mirror 5. On its other face, the block 2 forms a plane mirror 10 perpendicular to the axis 6 and arranged in the focal plane of the concave mirror 5.

The end of the input optical fiber 12 is flush with the surface of the plane mirror 10 and is very slightly offset relative to the focal point of the mirror 5. The beam 14 coming from the end of the fiber 12 passes through the zone in which the layer 8 is broken, and is reflected from the mirror 5 to give a parallel beam 15. In the beam 15 of spectral width A (FIG. 1), the band $A_1$ passes through the layer 8 and is reflected from the mirror 10 to give a parallel beam 16, which again passes through the layer 8; by reflection from the mirror 5, it becomes the beam 17, which is focused to a point which is slightly offset relative to the focal point of the mirror 5, and where it is collected by the output fiber 18.

In the parallel beam 15, the spectral band $A_2$ does not pass through the layer 8, but the latter reflects it like a plane mirror to give a new parallel beam 20, which is angularly offset in accordance with the angle of the layer 8 relative to the axis 6. The beam 20 is reflected to give a beam 21, which is focused on the end of another output fiber 22.

It is seen that the layer 8, by virtue of its structure and its inclination relative to the axis 6, separates the two bands $A_1$ and $A_2$ from the overall band A and, by modifying the angular direction of one of them, makes it possible to collect them on the two separate fibers 18 and 22. It will be noted that the non-reflecting zone 7 makes it possible to eliminate the rays coming from the input fiber 12, which rays could have reached the output fibers 18 and 22 directly without being filtered by the layer 8.

In practise, the multidielectric layer 8 is made of alternating layers having a high and low index and an optical thickness of about $\lambda_c/4$, $\lambda_c$ being the central wavelength of the band $A_2$, where the reflecting power must be at its maximum, and the filter thus formed being of order 0. For order 1, which permits a more distinct separation of the bands, the optical thickness of the layers will be $3\lambda_c/4$.

Thus, to separate a band $A_1$ of 7000 to 7400 Å and a band $A_2$ of 8000 to 8800 Å, the substrates 1 and 2 having an index of 1.563 and the filter being of order 1, layers H of index 2.35 and thickness 2,625 Å and layers L of index 1.35 and thickness of 4,569 Å will be used, the central wavelength of the band $A_2$ being taken at 8,225 Å. The layer 8 will in that case comprise a half layer H, then 9 layers L intercalated with 8 layers H, and then another half-layer H.

FIG. 4 thus shows the reflecting power as a function of the wavelength; the reflecting power will reach 0.998 for the 8000 to 8800 Å band, whereas it will be virtually zero for the 7000 to 7400 Å band.

Figure 3:
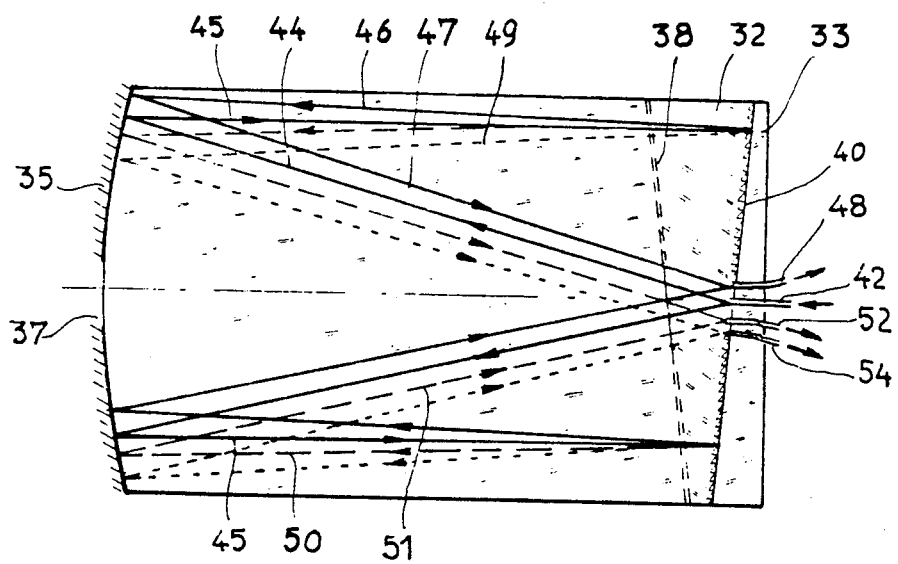
FIG. 3 shows a device which also functions as a monochromator in one wavelength band.

The more complete device of FIG. 3 makes it possible not only to select the band $A_1$, but also, within the band $A_1$, to select one or more monochromatic wavelengths.

For this purpose, the block 32, which is homologous to the block 2 of FIG. 2, is stuck to a third block 33 carrying a plane diffraction grating 40. As in the preceding case, the beam 44 coming from the end of the input fiber 42 is reflected by the mirror 35 to give a parallel beam 45, except for the rays which end at the non-reflecting zone 37. Here again, the band $A_2$, reflected by the layer 38 to give 50 and by the mirror 35 to give 51, is focused on to the output fiber 52.

On the other hand, after having passed through the layer 38, the wavelengths of the band $A_1$ impinge on the grating 40, which scatters them in different directions. Thus, for example, one of the wavelengths will be returned to give a parallel beam 46, this will then be reflected to give a beam 47, which will be focused on the end of the output fiber 48. Another wavelength will give the beam 49, which will be focused in the same way on to another output fiber 54. The optical unit thus formed therefore behaves like a band selector towards the band $A_2$ and like a monochromator towards the wavelengths of the band $A_1$.

Of course, the invention is not strictly limited to the embodiments which have been described as examples, but also covers the embodiments which would only differ therefrom in detail, in constructional variants or in the use of equivalent means. Thus, in the case of FIG. 2, instead of the input fiber 12 being slightly offset relative to the focal point of the mirror 5, the separation of the focusing on to the output fiber 18 from the end of the fiber 12 could also be achieved by placing this input fiber 12 just at the focal point of the concave mirror 5, but by giving the plane mirror 10 an angle which is very slightly different from 90° relative to the axis 6.

It would also be possible to use several multi-dielectric layers behind one another, with slightly different angles, thus producing the same number of dichroic mirrors, each layer separating two particular wavelength bands.

We claim:

1. A multiplexer-demultiplexer comprising:
   (a) a solid transparent member having a length and defining first and second ends, said first end being configured and dimensioned to form a support for a focusing surface;
   (b) first reflective means, adjacent said first end, for forming a reflective focusing surface;
   (c) second reflective means adjacent said second end for forming a reflective surface;
   (d) first light conducting means for sending or receiving light, said first light conducting means being positioned proximate said second end and positioned at a first end of a multi-branch path along which light is sent or received, said path extending from said first light conducting means toward said reflective focusing surface;
   (e) color selective reflective means positioned in said solid transparent member between said first end of said solid transparent member and said second reflective means for passing light of a first wavelength, and positioned proximate to said first light conducting means and configured for reflecting light of an other wavelength along a path different from that followed by light of said first wavelength, said color selective reflective means being planar in shape, and defining a central open portion which passes light of said first and other wavelengths;
   (f) second light conducting means for receiving or sending light of said other wavelength which is sent or received, respectively, by said first light conducting means, said second light conducting means being positioned proximate said second end and positioned at a first opposite path end of a first branching path, said first branching path extending from said first light conducting means though said open portion to said first reflective means, from said first reflective means to said color selective reflective means, from said color selective reflective means to said first reflective means and from said first reflective means through said open portion to said second light conducting means and proceeding in directions defined by rays of light of said other wavelength, travelling between said first light conducting means and said second light conducting means; and
   (g) third light conducting means positioned proximate said second end and positioned at a second opposite path end of a second branching path, said second branching path extending from said first light conducting means to said first reflective means, from said first reflective means, through said color selective reflective means, to said second reflective means, from said second reflective means, through said color selective reflective means, to said first reflective means, and from said first reflective means to said third light conducting means, and processing in directions defined by rays of light of said first wavelength travelling between said first and third light conducting means.

2. A multiplexer-demultiplexer as in claim 1, wherein said first reflective means contains a central portion which is not reflective.

3. A multiplexer-demultiplexer as in claim 1, wherein said color selective reflective means comprises a planar member which disposed is at an angle to the major axis of said solid transparent member.

4. A multiplexer-demultiplexer as in claim 1, wherein said color selective reflective means passes light of second and third wavelengths.

5. A multiplexer-demultiplexer as in claim 4, wherein said second light conducting means comprises a plurality of optic fibers which form a glass to glass interface with said solid transparent member, each positioned at the respective points corresponding to opposite path ends for light of said first, second and third wavelengths, said opposite path ends coincident with the paths followed by light of different wavelengths passing through said first light conducting means and wherein said second reflective means is a diffraction grating.

6. A multiplexer-demultiplexer as in claim 1, wherein said first end has a convex configuration and said reflective means comprises a coating of reflective material disposed on said convex end to form a concave mirror and, wherein said color selective reflective means comprises a planar member which is at an angle to the major axis of said solid transparent member.

7. A multiplexer-demultiplexer as in claim 1, wherein said second reflective means comprises a diffraction grating with a planar configuration, and, wherein said color selective reflective means comprises a planar member which is at an angle to the major axis of said solid transparent member.

8. A multiplexer-demultiplexer as in claim 7, wherein said diffraction grating is disposed at an anglw with respect to the major axis of said solid transparent member and said focusing surface defines a center point, and wherein a perpendicular to said focusing surface passing through said center point is approximately in the same direction as said major axis.

9. A multiplexer-demultiplexer as in claim 1, wherein said first, second and third light conducting means comprise fiber optic members which form glass-to-glass interfaces with said solid transparent member.

10. A multiplexer-demultiplexer as in claim 1, further compising a protective solid member, said second reflective means being disposed between said protective solid member and said solid transparent member.

11. A multiplexer-demultiplexer as in claim 1, wherein said second reflective means is a simple planar mirror.

* * * * *